US008137563B2

(12) United States Patent
Ma et al.

(10) Patent No.: US 8,137,563 B2
(45) Date of Patent: Mar. 20, 2012

(54) PREPARATION OF POLYSACCHARIDE BEADS

(75) Inventors: Guang-Hui Ma, Beijing (CN); Zhi-Guo Su, Beijing (CN); Qing-Zhu Zhou, Beijing (CN)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

(21) Appl. No.: 12/597,171

(22) PCT Filed: Apr. 21, 2008

(86) PCT No.: PCT/SE2008/000283
§ 371 (c)(1),
(2), (4) Date: Oct. 23, 2009

(87) PCT Pub. No.: WO2008/133571
PCT Pub. Date: Nov. 6, 2008

(65) Prior Publication Data
US 2010/0084328 A1 Apr. 8, 2010

(30) Foreign Application Priority Data

Apr. 25, 2007 (CN) .......................... 2007 1 0098700

(51) Int. Cl.
*B01D 15/08* (2006.01)
(52) U.S. Cl. .................... 210/656; 210/635; 210/198.2; 210/502.1
(58) Field of Classification Search .................. 210/635, 210/656, 198.2, 502.1; 502/404
See application file for complete search history.

(56) References Cited

U.S. PATENT DOCUMENTS

| 4,665,164 | A | * | 5/1987 | Pernemalm et al. | .......... 536/120 |
| 5,147,536 | A | * | 9/1992 | Engstrom | .................. 210/198.2 |
| 5,466,368 | A | * | 11/1995 | Arvidsson et al. | .......... 210/198.2 |
| 2008/0237124 | A1 | * | 10/2008 | Axen et al. | ..................... 210/635 |

OTHER PUBLICATIONS

Zhou, Journal of Colloid and Interface Science, vol. 311, Issue 1, Jul. 1, 2007, pp. 118-127.*
PTO 2011-0016 translation of China Patent No. 1640539.*
Lahooti, S., et al., "Effect of an immobilization matrix and capsule permeability on the variability of encapsulated HEK cells", Biomaterials. 21 (2000) 987-995.
Hayashi, H., et al., "Application of a novel B cell line MIN6 to a mesh-reinforced polyvinyl alcohol hydrogel tube and three layer agarose microcapsules: An in vitro study", Cell Transplantation. 5 (1996) S65-S69.
Hjerten, S., "The preparation of agarose spheres for chromatography of molecules and particles", Biochimica Et Biophysica Acta. 79 (1964) 393-398.
Egorev, A. M., et al., "Isolation of agarose and granulation of agar and agarose gel", Journal of Chromatography. 46 (1970) 143-148.
Bengtsson, S., et al., "Chromatography of animal viruses on pearl-condensed agar", Biochimica Et Biophysica Acta. 79 (1964) 399-406.

(Continued)

*Primary Examiner* — Ernest G Therkorn

(57) ABSTRACT

The present invention relates a method of preparing agarose beads, which method results in a population of beads which are of relatively uniform particle size. In an advantageous embodiment, the beads are of a particle size less than 10 μm, and the coefficient of variation C.V. of the population is less than 15%. The beads according to the invention are advantageously used in biological separation methods, such as in the production of chromatographic packing materials; drug carriers; or in any method of biological engineering.

9 Claims, 5 Drawing Sheets

OTHER PUBLICATIONS

Zhou, Q.-Z., et al., "Preparation of uniform-sized agarose beads by microporous membrane emulsification technique", Journal of Colloid and Interface Science. 311 (2007) 118-127.

CN1640539 A, Process Engineering Institute Chinese Academy of Science, Jul. 20, 2005 (abstract) Retrieved from WPI database, English machine translation.

* cited by examiner

PREPARATION OF POLYSACCHARIDE BEADS

CROSS-REFERENCE TO RELATED APPLICATIONS

This application is a filing under 35 U.S.C. §371 and claims priority to international patent application number PCT/SE2008/000283 filed Apr. 21, 2008, published on Nov. 6, 2008, as WO 2008/133571, which claims priority to patent application number 200710098700.9 filed in China on Apr. 25, 2007.

FIELD OF THE INVENTION

This invention relates to the preparation of polysaccharide particles, such as agarose beads, for use in biological separation, such as the purification of proteins and/or cells, as drug carriers or in general in the field of biological engineering.

BACKGROUND OF THE INVENTION

Agarose is a natural polysaccharide extracted from algae, and its aqueous solution forms a hydrogel at low temperatures. Agarose has been used as chromatography medium since 1960s, and has many advantageous characteristics, such as high hydrophilicity, high porosity, and hydroxyl groups available for functionalization. Agarose is frequently used as a base matrix e.g. in affinity chromatography, hydrophobic interaction chromatography (HIC), reverse phase chromatography (RPC) and ion exchange chromatography.

For example, Shahab Lahooti, et al. (Shahab Lahooti and Michael V. Sefton, Effect of an immobilization matrix and capsule permeability on the variability of encapsulated HEK cells, Biomaterials. 21 (2000) 987-995) described agarose as core substance, surrounded by a hydroxyethyl methacrylate-methyl methacrylate copolymer shell to embed the HEK cells. On the one hand, the big pore net structure of agarose can evenly disperse cell and facilitate the diffusion of nutrient substances and metabolic products, on the other hand, it also reduces bead membrane concentration, increases membrane permeability, and facilitates sufficient nutrient substance entry to beads for cell growth. The research shows that agarose facilitates maintenance of the embedded cell activity and cell division and proliferation. The experiment results show that the cells proliferated twice as much in presence of agarose as in the absence of agarose after 14 days mainly because agarose disperses the cells evenly and offers supporting substrate to cells.

Hiroyuki Hayashi, et al. (Hiroyuki Hayashi, Kazutomo Inoue, Tun Aung et al, Application of a novel B cell line MIN6 to a mesh-reinforced polyvinyl alcohol hydrogel tube and three layer agarose microcapsules: An in vitro study, Cell Transplantation 5 (1996) S65-S69) described the use of agarose in the preparation of three-layer gel capsules used to embed B cell line MIN6. The research results show the embedded B cell line MIN6 has twice as high insulin secretion rate as unembedded MIN6.

Stellan Hjertén (Stellan Hjertén, The preparation of agarose spheres for chromatography of molecules and particles, Biochimia Et Biophysica Acta. 79 (1964) 393-398) described emulsification of agarose in an inverse suspension gelation method, using agitator emulsification.

Spraying methods using nozzles have been suggested (A. M. Egorev, A. Kh. Vakhabov and V. Ya. Chernyak, Isolation of agarose and granulation of agar and agarose gel, Journal of Chromatography. 46 (1970) 143-148; and S. Bengtsson and L. Philipsson, Chromatography of animal viruses on pearl-condensed agar, Biochimia Et Biophysica Acta. 79 (1964) 399-406) for the preparation of agarose beads as a separating medium or living cell carrier.

However, known drawbacks of such emulsion methods are that the particle size of the liquid droplets can not be controlled, the prepared emulsion has uneven particle size, the cured agarose gel beads have uneven particle size. In the separation process, small gel beads will flock to the gaps between gel beads to increase column back pressure and evenly cause no separation due to uneven particle size. When gel beads are used to the embed cells, each bead embeds a different number of cells and different proliferation rates occur during cell growth due to their uneven particle size. In addition, agarose gel beads with uniform particle size are very important to research gel properties. Uneven particle size will lead to complex characterization of beads. In addition, it is very difficult to control the particle size of the prepared beads and to prepare beads of small sizes such as below about 10 μm in these traditional preparation processes.

CN200410000087.9 describes traditional microporous membrane emulsification to prepare agarose gel beads with controllable uniform particle size (hereinafter denoted preparation of agarose gel beads using traditional membrane emulsification method). The traditional membrane emulsification can result in particles of even size. In this process, membranes having different pore diameters are selected to prepare beads with particle sizes in the range of 3-60 μm. Agarose gel beads with smaller particle sizes such as less than 10 μm are prepared with membranes having correspondingly small pore diameters. The emulsification rate is very slow at high nitrogen gas pressure. An increased pressure can increase the emulsification rate to a certain extent, but too high pressure was shown to reduce the particle size uniformity of beads. When beads have high agarose content, high pressure leads to severe broadening of the bead size distribution. This is considered a substantial drawback of this traditional method for certain applications, where both high agarose content and a small particle size are important.

During chromatographic separation and purification of biological molecules, it is an advantage if the separating medium can withstand high flow rates. Thus, some problems are known with the agarose medium widely used in biological separation field. As is well known, agarose gel structure is formed by mutual action of hydrogen bonds. At gelling state, polysaccharide chains will form a porous net structure through staggered hydrogen bonds between chains. This gel formed by non-covalent structure has low mechanical strength, and is consequently not capable of withstanding very high flow rates. The strength of agarose gel beads is increased using two methods.

U.S. Pat. No. 4,665,164 (Per-Åke Pernemalm, Mats Lindgren and Göran Lindgren. 1984. Polysaccharide crosslinked separation material and its preparation) relates to chemical crosslinking, namely that covalent bonds are introduced between hydroxyl groups on the polysaccharide chain to increase the mechanical strength of the gel. With a constant crosslink density, an alternative method is to increase the agarose content of the gel beads, by increasing the agarose solution concentration in the water phase. With increasing concentration of the agarose aqueous solution, however, its viscosity is increasing. In case of use of traditional membrane emulsification method to prepare agarose gel bead, the increasing viscosity of water phase brings about difficulties in emulsion preparation process. It is very difficult for the formed liquid droplets to detach from the membrane surface due to the higher viscosity of the water phase. In the case where small size liquid droplets are formed, these droplets will plug the membrane pores after a long emulsification process. The experiment results show that when traditional microporous membrane emulsification method is used to prepare gel beads with small particle size and high agarose content, high viscosity of the water phase leads to slow W/O emulsion preparation process even at high pressure.

SUMMARY OF THE INVENTION

In a first aspect, the present invention relates to a method of preparing agarose gel beads which method avoids one or more of the above-discussed drawbacks. The method is as defined in one or more of the appended claims.

A specific aspect of the invention is a method as described above, which results in agarose gel beads with small particle size, such as an average particle size less than 10 µm. In another aspect, the invention relates to a method of preparing agarose beads wherein the agarose content is as high as 20 wt % (by total bead weight).

In another aspect, the present invention relates to an agarose gel bead with small particle size. In a specific embodiment, a population of such particles will present an average particle size below 10 µm, and/or a uniform particle size. In one aspect, the invention provides a population of agarose gel beads presenting an average particle size of less than 10 µm. In a specific embodiment, the agarose content of the beads is as high as 20 wt % (by total bead weight).

Further aspects and advantages of the present invention will appear from the detailed disclosure that follows.

DETAILED DESCRIPTION OF THE INVENTION

Figure 1:
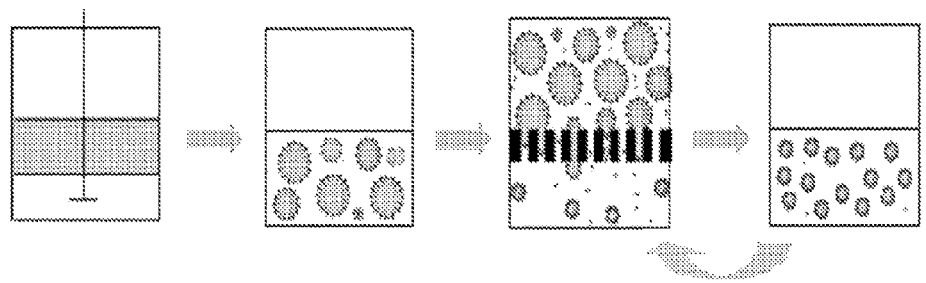
FIG. 1 is a schematic drawing for the principle to prepare agarose gel beads with small particle size according to the invention. More specifically, a hot aqueous agarose solution is mixed with a hot oil phase and an initial W/O emulsion is prepared using an agitator. This emulsion is then forced through the membrane to obtain an emulsion with uniform size droplets.

In brief, according to the present invention, an improved membrane emulsification method is used to prepare agarose beads, which may be of relatively small particle size. Unless otherwise specified, in the present specification and claims, particle size is given in µm, concentration in wt %, and temperature in ° C. in this invention. This invention will now be described in more detail.

A first aspect of the present invention is a method of preparing agarose gel beads, which method comprises the following steps:
(a) providing an agarose aqueous phase W comprising agarose;
(b) providing a water-immiscible oil phase O, in which at least one emulsifier is dissolved;
(c) mixing the water phase W and oil phase O to obtain a W/O emulsion;
(d) passing the emulsion through a hydrophobic microporous membrane by applying pressure to obtain a W/O emulsion; and
(e) reducing the temperature of the W/O emulsion droplets to form agarose gel beads.

More specifically, in step (a), an agarose aqueous solution is provided which presents a preset concentration. The solution provided in step (a) will constitute the aqueous, or water, phase in the present method, and is therefore denoted W (for water). Thus, the agarose solution will form aqueous droplets within the water-immiscible phase.

In one embodiment, the agarose concentration in this solution is between 0.1 wt % and 20.0 wt %, and more specifically between 4.0 and 15.0 wt %; such as ≧6.0 or ≧12.0 wt %.

In step (b), the oil phase is provided. This phase is comprised of an oily substance, in which at least one oil-soluble and/or oil-dispersible emulsifier is dissolved/dispersed. This phase is immiscible with water, and consequently denoted O (for Oil).

In step (c), mixing is provided between the water phase W and oil phase O to obtain an emulsion. In one embodiment, the volume ratio of water phase to oil phase is between 1:1 and 1:1000, and more specifically between 1:2 and 1:10.

In step (d), the emulsion i.e. the emulsion provided in step (c), is passed by applying a pressure through a hydrophobic microporous membrane. In one embodiment, the pressure is 0.5-3.0 kgf/cm$^2$ in step (d). In one embodiment, the emulsion is made to pass the membrane with a relatively high flow rate. In another embodiment, the membrane is a glass membrane. In a specific embodiment, the membrane is a glass membrane which has been rendered hydrophobic by chemical treatment according to well known methods. Such hydrophobic glass membranes are commercially available products. In another embodiment, the membrane is manufactured from a material which is hydrophobic in itself. In this context, it is understood that the term "hydrophobic" means that the membrane presents a sufficient hydrophobicity to allow preparation of the gel beads as disclosed herein. The membrane can have any type of basic pore structure, such as e.g. a network pore structure with tortuous pores or straight cylindrical pores perpendicular to the membrane surface. The shape of the membrane can be e.g. tubular, hollow fibre, flat sheet or pleated sheet. In one embodiment, the pressure used to force the emulsion through the membrane is set at a preselected value. According to the present invention, by using pressure to pass an emulsion of agarose droplets through a membrane at a preset pressure value, a W/O emulsion with uniform particle size may be obtained. In one embodiment, the microporous membrane used in the present method has pore diameter between 2 and 50 µm, such as 2-40 or 2-30 or even 2-20 µm. In another embodiment, the pressure applied is 0.5-3.0 kgf/cm$^2$. As the skilled person will realize, an advantageous pressure value will be dependent on the membrane pore diameter, the agarose content in the water phase and the temperature. For example, when a membrane with a pore diameter of 10.2 µm is used to prepare beads with an agarose content of 10 wt % below 65° C., a suitable pressure is 1.0 kgf/cm$^2$; when a membrane with a pore diameter of 5.7 µm is used to prepare beads with an agarose content of 10 wt % below 65° C., a suitable pressure is 2.5 kgf/cm$^2$. In one embodiment, the emulsion will pass through the microporous membrane at 0.5-1.5 m$^3$m$^{-2}$h$^{-1}$. An advantageous rate is then dependent on the membrane pore diameter, the agarose content in the water phase, the temperature and the pressure. When a membrane with a pore diameter of 10.2 µm is used to prepare beads with an agarose content of 10 wt % at 1.0 kgf/cm$^2$, the emulsion producing rate will be about 0.8 m$^3$m$^{-2}$h$^{-1}$, meaning that the emulsification process is completed momentarily.

Advantageously, steps (c) and (d) are conducted at a temperature above ambient temperature. In a specific embodiment, the operation temperature in step (c) is dependent on the agarose content in the water phase and the raw material for agarose. When the raw material is the same type of agarose, the temperature depends on agarose content in the water phase, namely that the higher content, the higher temperature. Take the agarose with high melting point as an example. When the agarose content in the water phase is 4 wt %, the temperature is 60° C.; when the agarose content in the water phase is 8 wt %, the temperature is 65° C.; when the agarose content in the water phase is 12 wt %, the temperature is 70° C. In case of the same agarose content in the water phase, the temperature depends on the type of agarose. Take agarose content in a water phase of 4 wt % as an example. In case of use of agarose with low melting point, the temperature is 40° C., while in case agarose with high melting point, the temperature is 60° C.

In step (e), W/O emulsion droplets are allowed to solidify i.e. gel into agarose beads. In one embodiment, the operating temperature is about 15° C. in step (e).

The method according to the invention can be used to prepare agarose beads with small particle size, as will be discussed in more detail below. Such beads are useful e.g. as chromatography packing materials, e.g. in gel filtration methods.

In a specific embodiment of the present method, an additional step is added which comprises adding functionalities to the solidified agarose beads after step (e). The skilled person is well acquainted with methods for adding such functionalities, which may be e.g. charged groups for the use of the beads in ion exchange chromatography.

As a general example, a chemically decorated surface of hydrophobic glass may be used as the microporous membrane of the present method. The oil and water phases are homogenized and emulsified, or mixed at high temperature to obtain W/O emulsion; the emulsion quickly passes through the microporous membrane at high pressure to reduce the size of the liquid droplets in the emulsion. It is emulsified repeatedly to obtain the emulsion with uniform particle size. The emulsion is cooled and solidified to obtain the agarose beads with uniform particle size. The novel membrane emulsification method according to the invention may be used to prepare agarose beads with uniform size and particle size less than 10 µm. When the agarose concentration is as high as 20 wt %, the obtained beads advantageously still will have high particle size evenness. The invention may be used to prepare populations of beads with an average particle size of less than 10 µm, uniform particle size and high agarose content and also to control the average particle size of the obtained bead by selection of different membrane pore diameters. In a specific embodiment of the invention, the preparation method includes the following steps:

(a) agarose is heated and dissolved in distilled water to obtain a solution, which is used as water phase.

(b) at least one emulsifier is dissolved in a water-immiscible oil phase, and preferably preheated.

(c) the water and oil phases are quickly mixed, homogenized and emulsified and then mechanically stirred to obtain a W/O emulsion.

(d) the emulsion is quickly passed through a hydrophobic microporous membrane at high temperature and pressure to obtain W/O emulsion with a substantially uniform droplet size To obtain an even more uniform droplet size, the emulsion obtained every time can be used as emulsion to pass through membrane pores repeatedly;

(e) the emulsion is transferred to a cooling plant and cooled under slow agitation, at a temperature below 15° C. so that the emulsion droplets are solidified into beads of gelled agarose of substantially uniform size. Under advantageous conditions, the particle size distribution coefficient of the agarose gel beads is controlled below 15%, and the particle size between 1 and 10 µm (excluding 10 µm) is controlled by the membrane pore diameter.

According to the present invention, the emulsification process may be conducted above ambient temperature, as the agarose solution with different concentration has different solidification temperatures and different membrane emulsification temperatures. The higher the concentration, the higher the temperature. Although the agarose solution has the same concentration and different solidification temperature, it needs different temperatures when it is used as water phase to quickly pass through the membrane for emulsification. In case of a water phase with the same concentration, the agarose with low melting point needs low temperature, the agarose with high solidification temperature needs high temperature.

In an advantageous embodiment, the pressure is relatively high in the process according to the invention. The suitable pressure will depend on membrane pore diameter, agarose content in the water phase and temperature. For example, when a membrane with pore diameter of 10.2 µm is used to prepare beads with agarose content of 10 wt % below 65° C., the pressure is 1.0 kgf/cm²; when a membrane with pore diameter of 5.7 µm is used to prepare beads with agarose content of 10 wt % below 65° C., the pressure is 2.5 kgf/cm².

The method according to the invention may be used to prepare agarose gel beads used to separate and purify chemically active substances or as a carrier for encapsulation of cells and drugs. The beads may have size less than 10 µm, and/or an agarose content as high as 20 wt %. Thus, one advantage of the present method is that the uniform particle size can be controlled. Thus, the invention solves such problems as inability of traditional membrane emulsification method to obtain uniform and controllable particle size and prepare the beads with small particle size and high agarose content, and can be used to quickly prepare relatively small beads, such as beads with particle size less than 10 µm, and/or agarose concentrations of up to 20 wt %.

A second aspect of the invention is at least one agarose bead prepared as described above. In a specific embodiment, this aspect of the invention is an agarose gel bead with small particle size. In this context, the term "small" particle size means that in a population of such beads, the average particle size is below 10 µm. In another embodiment, a population of beads according t the invention will present a substantially uniform particle size. In a specific embodiment, the agarose content of the beads is as high as 20 wt % (by total bead weight). More specifically, the coefficient of variation calculated according to the following formula is not more than 15%:

$$C.V.=\{[\Sigma(d_i-d)^2/N]^{1/2}/d\}\times100\%$$

wherein C.V. is the coefficient of variation, $d_i$ is the bead diameter, d is the number-average particle size, N is the quantity of beads for particle size calculation, with $N \geq 200$.

The pore diameter of microporous membrane adopted in this invention may be as discussed above, such as 2-20 µm, and the average particle size of the prepared bead has linear relationship with the adopted membrane pore diameter. Thus the agarose beads with required particle size could be prepared by changing the membrane pore diameter.

Some advantages of the present invention are as follows. The preparation method in this invention may be used to prepare the agarose gel beads used as biological separation medium and also prepare the agarose gel beads used as living cell or gene carrier in order to offer helpful microenvironment for cell proliferation and endosomatic treatment effect and effectively avoid endosomatic lymphocyte identification and immunological rejection.

Further, the gel bead in this invention is used as separating medium to effectively increase separating effect and separate chemical activity substances, which can not be separated by general medium, due to uniform particle size.

In addition, the present invention may provide gel beads with different agarose contents. The gel beads can be used to effectively research the relationship between macromolecule substances with different pore diameter and different size, such as protein, nucleic acid, etc., and their separating effect and find the gel bead with the most suitable pore diameter used to separate different substances. The preparation method according to the present invention may be used to easily prepare gel beads with high agarose content, which is difficultly prepared in traditional emulsification method, to obtain gel beads with high mechanical strength and quickly separate chemical activity substances at high pressure.

The preparation method of the present invention uses mild conditions. As the carrier of active substances, such as living cell, etc., the bead is expected to keep its chemical activity and chemical stability. As cell and drug carriers, the beads assure the even distribution of embedded substance and quick and correct subsequent separation. This invention needs simple experiment equipment and no pump or stirrer to make the continuous phase flow, and has such features as easy process scaling-up, and simple preparation process, easy operation control and quick emulsion formation.

In a third aspect, the present invention relates to a chromatography column which is packed with agarose beads as described herein. The chromatography column may be used in methods for the separation, isolation or purification of organic and/or biological substances and components, such as proteins, e.g. antibodies or fragments or fusion proteins thereof, peptides, nucleic acids, such as plasmids, virus, cells, lipids etc. The chromatography column can be used e.g. en gel filtration, or in ion exchange methods, depending on the exact nature of the agarose beads prepared according to the invention. In alternative aspects, the functionalization is to prepare chromatography media for hydrophobic interaction (HIC); mixed or multi-modal chromatography; or affinity chromatography.

EXAMPLES

The agarose bead preparation method offered in this invention will be described using examples. The following examples are provided for illustrative purposes only, and should not be construed as limiting the invention as defined by the appended claims.

The agarose gel beads are prepared according to the steps as shown in FIG. 1 as follows.

1) W/O Emulsion Preparation

Figure 2:
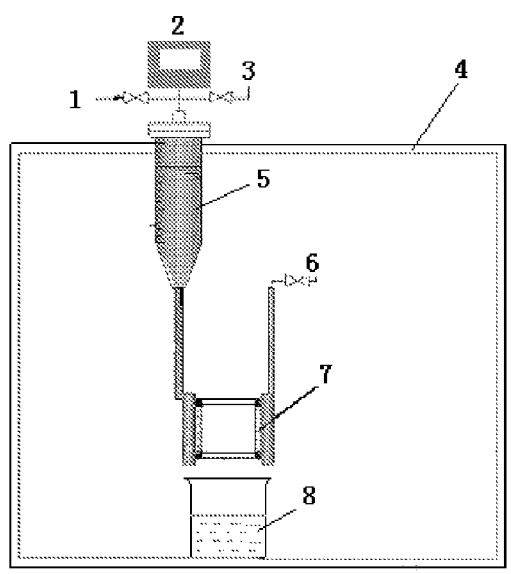
FIG. 2 shows a schematic drawing for a homogeneous emulsion preparation plant. The numbers illustrate the following: 1-nitrogen gas inlet; 2-pressure gauge; 3-vent valve; 4-thermal insulating layer; 5-emulsion storage tank; 6-vent valve; 7-membrane; 8-homogeneous emulsion collector.

Agarose, NaCl and other additives are added to water and fully dissolved under heating to form the mixture used as the water phase, and an oil-soluble emulsifier is dissolved in oily fluid and heated to a temperature to form a mixture used as the oil phase. The water and oil phase are quickly mixed and homogenized and emulsified or stirred to obtain W/O emulsion, which is passed through the hydrophobic microporous membrane at high temperature and pressure to obtain a W/O emulsion with uniform particle size. The process is completed in the setup as shown in FIG. 2. The emulsion is transferred to a cooling setup and cooled under slow agitation below 15° C. so that the emulsion droplets are solidified into agarose gel beads of uniform size.

The agarose solution can be prepared to the required concentration. The agarose solution with different concentration needs different temperature for membrane emulsification, so the required concentration can be selected. During preparation of cell or drug carriers, agarose is dissolved at high temperature and cooled to a temperature that is tolerable for the cells or the drug, but not low enough to result in solidification of the agarose solution. The solution is well mixed with cells or the drug and used as the water phase. The water phase additives can include water soluble substances harmless to human body, such as albumin, lecithin, glucose, mannitol, etc. The oil phase is a liquid at ambient temperature and water insoluble oily substance, so liquid paraffin and petroleum ether, olive oil, cotton seed oil, bean oil, sunflower seed oil or other alkyl hydrocarbon, or their mixture can be used as the oil phase. The preferred oil phase generally has a high boiling point and low volatility. Oily emulsifier must be dissolved in the oil phase, so sorbitan sesquiolate (Arlace183), glycerol ether polymer (such as Sakamoto Yakuhin Kogyo Co Ltd. PO-500, PO-310), polyethylene glycol hydrogenated castor oil, sorbitan trioleate (Span 85), sorbitan monooleate (Span 80), sorbitan tristearate (Span 65) or lipophilic-hydrophilic block polymer can be used a oily emulsifier. The emulsifier in the oil phase has a concentration between 0.5 and 1.0 wt %, and the volume ratio of water phase to oil phase is 1:1-1:1000.

2) Agarose Gel Bead Preparation

The emulsion obtained in Step 1) is transferred to a cooling setup and cooled under slow agitation below 15° C. so that the emulsion droplets are solidified. The obtained gel beads are stored in distilled water.

During gel solidification, temperature drops slowly below 2° C./min and the stirring is slow, with stirring rate between 50-200 rpm.

After solidification of emulsion droplets, the obtained gel beads are washed with petroleum ether, ethanol, distilled water in order (In case of use as cell carrier, no acetone or ethanol can be used to wash it), and the obtained gel is stored in distilled water or cell culture fluid at ambient temperature or low temperature.

Example 1

Figure 3:
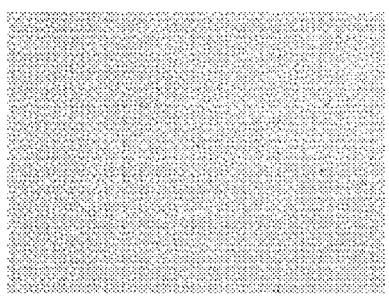
FIG. 3 shows an optical microscope photo of the agarose gel beads prepared in Example 1. Uniform size beads of 5.1 micron average diameter were obtained. 1 cm corresponds to 50 microns.

The hydrophobic membrane with pore diameter of 10.2 µm is soaked in lipophilic substance in order to fully wet porous membrane and thoroughly stretch hydrophobic chains on the membrane. The agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly passed through the hydrophobic microporous membrane with uniform pore diameter at 1.0 kgf/cm$^2$ to obtain a W/O emulsion with uniform particle size. The obtained emulsion is used as emulsion to pass through hydrophobic membrane at 1.0 kgf/cm$^2$ so that it can be emulsified three times. After emulsification, the emulsion is transferred to a cooling setup and cooled slowly under agitation at the stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 5.11 µm and C.V. of 9.8%, and the beads in the optical microscope photo as shown in FIG. 3 have uniform particle size.

Comparative Example 1 (Mechanical Stirring Method)

Figure 4:
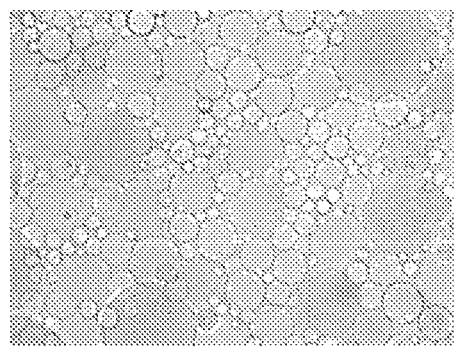
FIG. 4 shows an optical microscope photo of the agarose gel beads prepared in Comparative Example 1. Large polydisperse beads were prepared by agitator emulsification. 1 cm corresponds to 50 microns.

Similarly to the recipe in Example 1, the agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 20 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 6 g of water phase is transferred to oil phase and stirred for 30 minutes at 1000 rpm to the obtained W/O emulsion, which is quickly transferred to a cooling setup and cooled slowly under agitation at the stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 15.34 µm and C.V. of 115.97%, and the beads in the optical microscope photo as shown in FIG. 4 have non-uniform particle size.

Comparative Example 2 (Homoemulsification Method)

Figure 5:
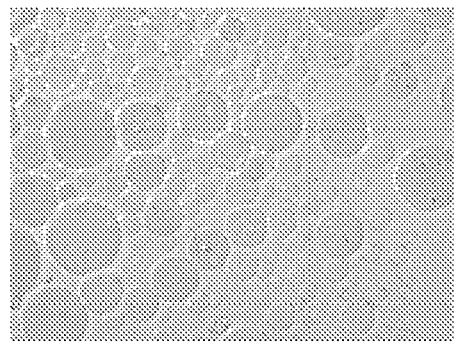
FIG. 5 shows an optical microscope photo of the agarose gel beads prepared in Comparative Example 2. Large polydisperse beads were prepared by agitator emulsification. 1 cm corresponds to 50 microns.

Similarly to the recipe in Example 1, the agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 6 g of water phase is transferred to oil phase and stirred for 60 seconds at 6000 rpm to the obtained W/O emulsion, which is quickly transferred to a cooling setup and cooled slowly under agitation at the revolution speed of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in laser particle sizer MASTERSIZER® 2000E. The beads in water have the average diameter of 15.48 µm and C.V. of 84.34%, and the beads in the optical microscope photo as shown in FIG. 5 have uneven particle size.

Comparative Example 3 (Traditional Membrane Emulsification Method)

Figure 6:
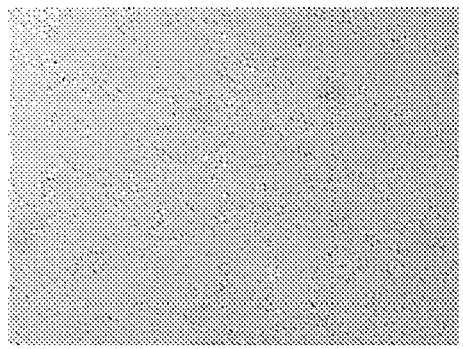
FIG. 6 shows an optical microscope photo of the agarose gel beads prepared in Comparative Example 3. Beads of average diameter 3.7 microns and C.V. 18%, prepared by traditional membrane emulsification, were obtained. 1 cm corresponds to 50 microns.

The hydrophobic membrane with pore diameter of 1.4 µm is soaked in lipophilic substance in order to fully wet porous membrane and thoroughly stretch hydrophobic chains on the membrane. The agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 60 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 6 g of water phase is transferred to membrane emulsification plant preheated to 65° C. in the oil phase and slowly passed through the hydrophobic microporous membrane with uniform pore diameter at 0.75 kgf/cm$^2$ and enters the oil phase to obtain W/O emulsion with uniform particle size. The obtained emulsion is transferred to a cooling setup and cooled slowly under agitation at a stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 3.69 μm and C.V. of 17.97%, and the beads in the optical microscope photo as shown in FIG. 6 have uneven particle size.

Figure 7:
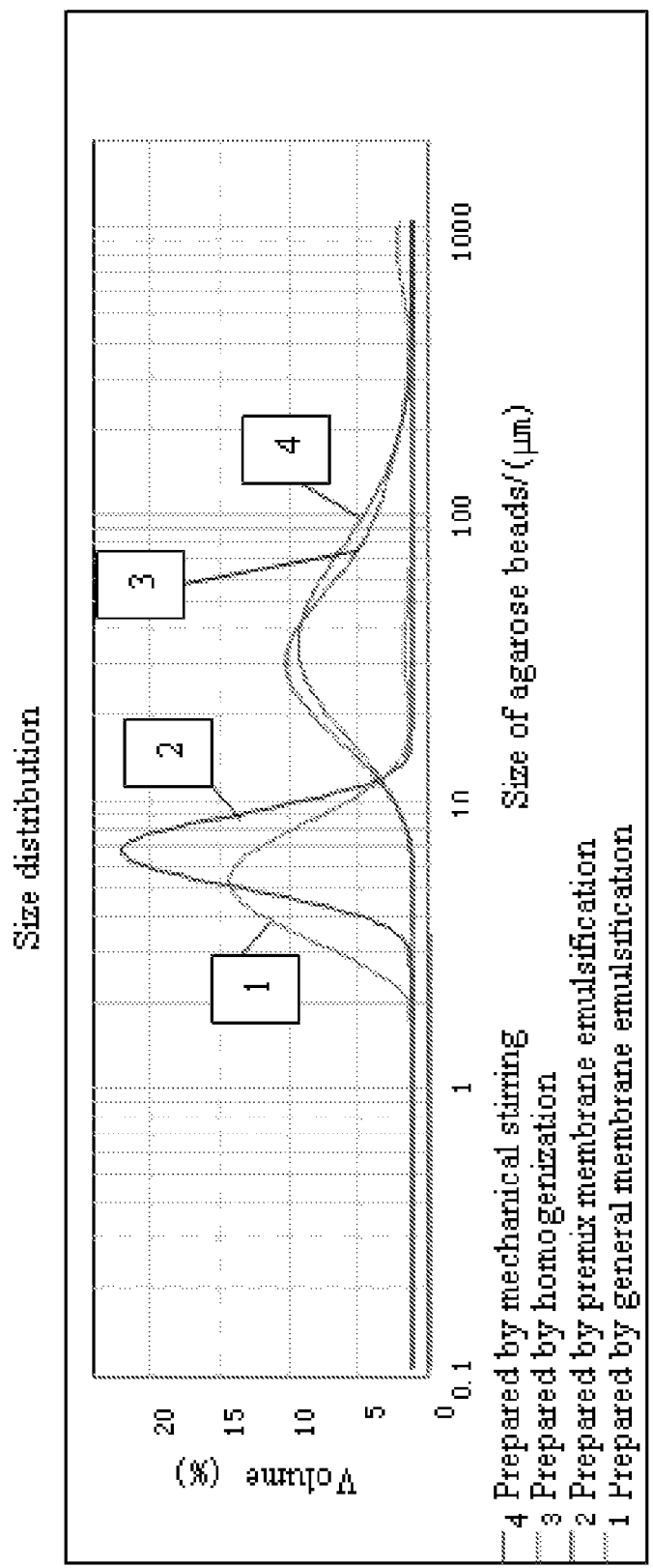
FIG. 7 shows the measured particle size distributions of the agarose gel beads prepared in Comparative Examples 1, 2 and 3 and Example 1. The X axis shows the size of the agarose beads/(micron), and the Y axis shows the volume (%). Curve 1—Comparative example 3, Curve 2—Example 1, Curve 3—Comparative example 2, Curve 4—Comparative example 1.

In comparison of particle size distribution of the agarose gel beads prepared in Example 1 and Comparative Example 1, 2 and 3, the beads obtained using the quick membrane emulsification method have the most uniform particle size as shown in FIG. 7.

Example 2

The hydrophobic membrane with pore diameter of 5.7 μm is soaked in lipophilic substance in order to fully wet porous membrane and thoroughly stretch hydrophobic chains on the membrane. The agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly passed through the hydrophobic microporous membrane with uniform pore diameter at 2.5 kgf/cm$^2$ to obtain W/O emulsion with uniform particle size. The obtained emulsion is used as emulsion to pass through hydrophobic membrane at 2.5 kgf/cm$^2$ so that it can be emulsified three times. After emulsification, the emulsion is transferred to a cooling plant and cooled slowly under agitation at the stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 3.06 μm and C.V. of 19.18%.

Example 3

The hydrophobic membrane with pore diameter of 15 μm is soaked in lipophilic substance in order to fully wet porous membrane and thoroughly stretch hydrophobic chains on the membrane. The agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly passed through the hydrophobic microporous membrane with uniform pore diameter at 0.8 kgf/cm$^2$ to obtain W/O emulsion with uniform particle size. The obtained emulsion is used as emulsion to pass through hydrophobic membrane at 0.8 kgf/cm$^2$ so that it can be emulsified three times. After emulsification, the emulsion is transferred to a cooling plant and cooled slowly under agitation at the revolution speed of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 7.66 μm and C.V. of 6.72%.

Example 4

Figure 8:
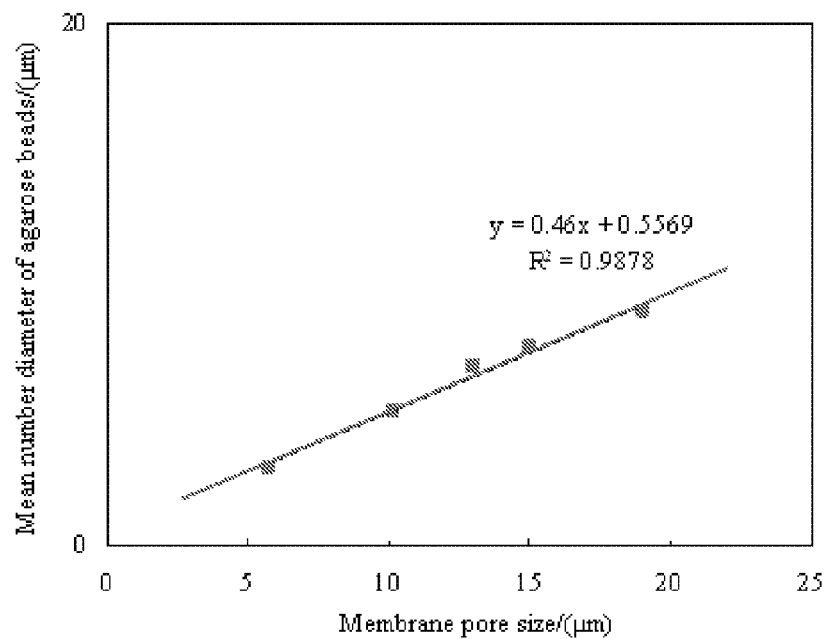
FIG. 8 shows the relationship between the average particle size of agarose gel beads prepared with the membranes with different pore diameters (mean diameter of agarose beads/(micron) shown on the Y axis) and membrane pore diameters (membrane pore size/(micron) shown on the X axis). As appears from this figure, a linear dependence with slope 0.46 was obtained: y=0.46x+0.5569, $R^2$=0.9878.

The hydrophobic membrane with pore diameter of 19 μm is soaked in lipophilic substance in order to fully wet porous membrane and thoroughly stretch hydrophobic chains on the membrane. The agarose and NaCl are correctly weighed to water to assure agarose concentration of 10 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly passed through the hydrophobic microporous membrane with uniform pore diameter at 0.6 kgf/cm$^2$ to obtain W/O emulsion with uniform particle size. The obtained emulsion is used as emulsion to pass through hydrophobic membrane at 0.6 kgf/cm$^2$ so that it can be emulsified three times. After emulsification, the emulsion is transferred to a cooling setup and cooled slowly under agitation at the revolution speed of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in laser particle sizer MASTERSIZER® 2000E. The beads in water have the average diameter of 9.02 μm and C.V. of 14.66%. The relationship between average particle size of the beads prepared in Examples 1, 2, 3 and 4 and membrane pore diameter is shown in FIG. 8. It can be seen from FIG. 8 that average particle size and membrane pore diameter have the linear relationship, and the average bead size is about 0.46 times the membrane pore diameter.

Example 5

The hydrophobic membrane with pore diameter of 10.2 μm is soaked in lipophilic substance in order to fully wet porous membrane and thoroughly stretch hydrophobic chains on the membrane. The agarose and NaCl are correctly weighed to water to assure agarose concentration of 4 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly pass through the hydrophobic microporous membrane with uniform pore diameter at 1.0 kgf/cm$^2$ to obtain a W/O emulsion with uniform particle size. The obtained emulsion is used as emulsion to pass through hydrophobic membrane at 1.0 kgf/cm$^2$ so that it can be emulsified three times. After emulsification, the emulsion is transferred to a cooling plant and cooled slowly under agitation at a stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 5.66 μm and C.V. of 11.66%.

Example 6

The hydrophobic membrane with pore diameter of 10.2 μm is soaked in lipophilic substance in order to fully wet porous membrane and thoroughly stretch hydrophobic chains on the membrane. The agarose and NaCl are correctly weighed to water to assure agarose concentration of 8 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 65° C. and quickly pass through the hydrophobic microporous membrane with uniform pore diameter at 1.0 kgf/cm$^2$ to obtain W/O emulsion with uniform particle size. The obtained emulsion is used as emulsion to pass through hydrophobic membrane at 1.0 kgf/cm$^2$ so that it can be emulsified three times. After emulsification, the emulsion is transferred to a cooling setup and cooled slowly under agitation at a stirring rate of 50 rpm in the air to room temperature and then a small amount of ice is added to the water bath to continuously cool the emulsion below 15° C. for agarose emulsion droplet solidification. The obtained gel beads are filtered and washed with petroleum ether, ethanol and distilled water in order and stored in distilled water. The average particle size distribution of the beads is tested in a laser particle sizer MASTERSIZER® 2000E. The beads in water have the average diameter of 5.09 μm and C.V. of 12.06%.

Example 7

Figure 9:
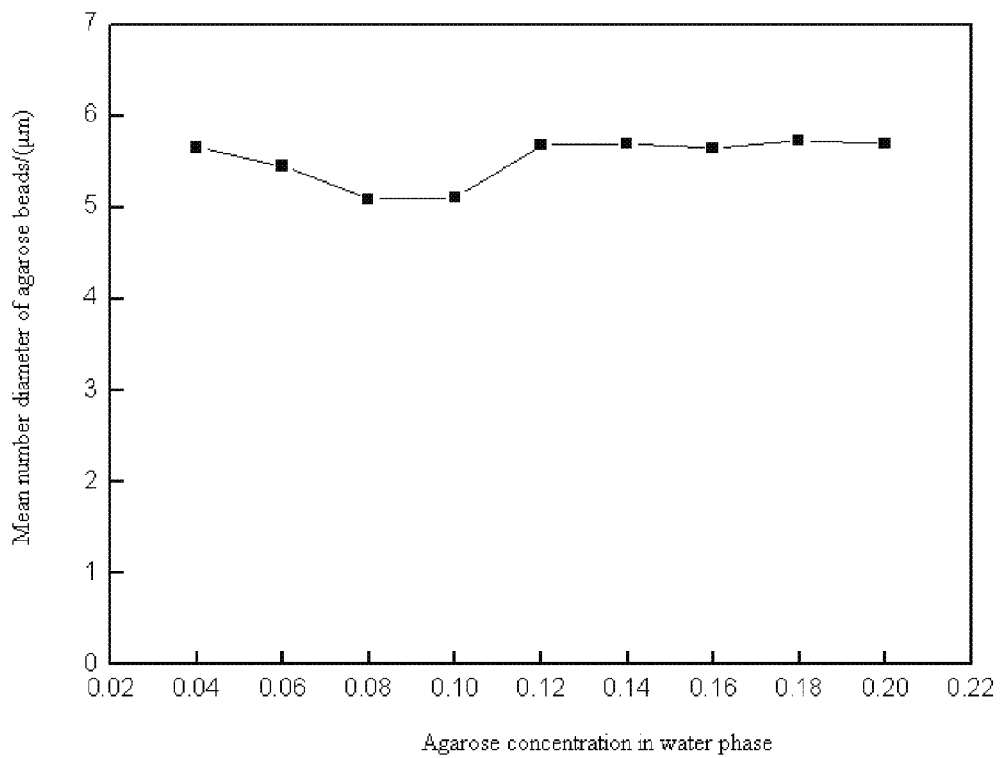
FIG. 9 shows the relationship between the average particle size of the beads with different agarose contents and agarose solution concentration. The X axis shows the agarose concentration in the water phase, while the Y axis shows the mean number diameter of agarose beads/(micron). As appears from this figure, the particle size does not depend strongly on the agarose concentration.
Figure 10:
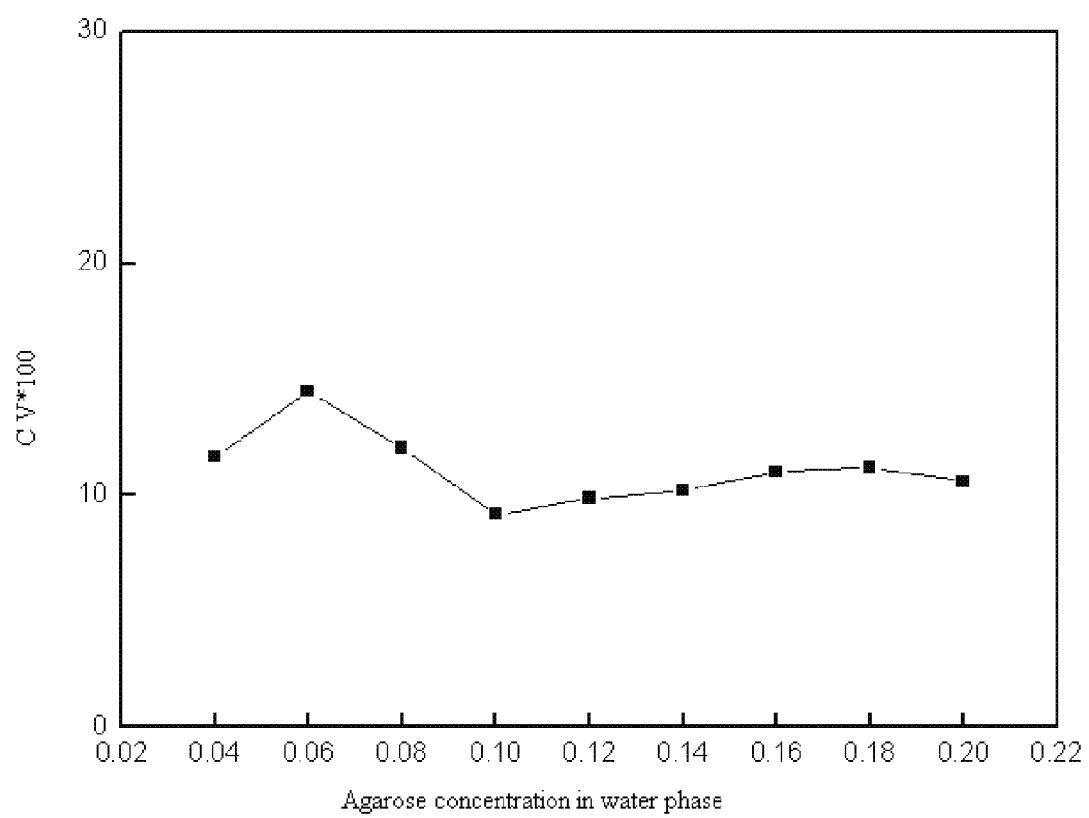
FIG. 10 shows the relationship between the coefficient of variation of the beads prepared with different agarose contents and the agarose solution concentration. The X axis shows the agarose concentration in the water phase, while the Y axis shows C.V*100. As appears from this figure, beads with C.V. 10% can be obtained with at least up to 20% agarose concentration.

The hydrophobic membrane with pore diameter of 10.2 μm is soaked in lipophilic substance in order to fully wet porous membrane and thoroughly stretch hydrophobic chains on the membrane. The agarose and NaCl are correctly weighed to water to assure agarose concentration of 20 wt %, and NaCl concentration of 0.9 wt %. They are heated and fully dissolved in water to form a solution, which is kept below 65° C. The oil-soluble emulsifier PO-500 is added to 16 ml of liquid paraffin and petroleum ether mixture (volume ratio of 7:5) to assure the concentration of 4 wt %, stirred until they are thoroughly dissolved to form the mixture used as the oil phase, and heated to 65° C. Under heating, about 4 g of water phase and oil phase are mixed and homogenized and emulsified for 30 seconds at 6000 rpm, and then the obtained emulsion is quickly transferred to the membrane emulsification setup preheated to 80° C. and quickly pass through the hydrophobic microporous membrane with uniform pore diameter at 1.4 kgf/cm$^2$ to obtain W/O emulsion with uniform particle size. The obtained emulsion is used as emulsion to pass through hydrophobic membrane at 1.4 kgf/cm$^2$ so that it can be emulsified three times. After emulsification, the emulsion is transferred to a cooling setup and cooled slowly under agitation at a stirring rate of 50 rpm in the air to room temperature and then a small amount of ice is added to the water bath to continuously cool the emulsion below 15° C. for agarose emulsion droplet solidification. The obtained gel bead is filtered and washed with petroleum ether, ethanol and distilled water in order and stored in distilled water. The average particle size distribution of the beads is tested in laser particle sizer MASTERSIZER® 2000E. The beads in water have the average diameter of 5.70 μm and C.V. of 10.22%. The relationship between the average particle size and particle size distribution coefficient of the agarose gel beads with different concentration and concentration is shown in FIGS. 9 and 10. When agarose concentration is as high as 20 wt %, agarose can be used to obtain the agarose gel beads with uniform particle size.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A method of preparing agarose gel beads, which method comprises the following steps:
   (a) providing an agarose aqueous phase W comprising agarose;
   (b) providing a water-immiscible oil phase O, in which at least one emulsifier is dissolved;
   (c) mixing the water phase W and oil phase O to obtain a W/O emulsion;
   (d) passing the emulsion through a hydrophobic microporous membrane by applying pressure to obtain a W/O emulsion with substantially uniform droplet size; and
   (e) reducing the temperature of the W/O emulsion droplets until agarose gel beads are formed.

2. The method of claim 1, wherein the pressure is 0.5-3.0 kgf/cm$^2$ in step (d).

3. The method of claim 1, wherein the emulsion flow rate through the microporous membrane is between 0.5 and 1.5 m$^3$ m$^{-2}$ h$^{-1}$ in step (d).

4. The method of claim 1, wherein the pore diameter of the microporous membrane is between 2 and 20 μm.

5. The method of claim 1, wherein the agarose concentration in step (a) is between 0.1 wt % and 20.0 wt %.

6. The method of claim 1, wherein steps (a), (c) and (d) are conducted under heating.

7. The method of claim 1, wherein step (d) results in agarose gel beads having a substantially uniform particle size.

8. The method of claim 1, which includes a step of adding functionalities to the agarose gel beads obtained from step (e).

9. The method of claim 8, wherein the functionalities are charged groups.

* * * * *